US011178533B2

(12) United States Patent
Marjou et al.

(10) Patent No.: US 11,178,533 B2
(45) Date of Patent: Nov. 16, 2021

(54) METHOD FOR DYNAMICALLY CONFIGURING ENTITIES OF A COMMUNICATIONS NETWORK FOR ROUTING DATA FROM A VISITOR TERMINAL

(71) Applicant: ORANGE, Issy-les-Moulineaux (FR)

(72) Inventors: Xavier Marjou, Chatillon (FR); Benoit Radier, Chatillon (FR); Gael Fromentoux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/956,108

(22) PCT Filed: Dec. 19, 2018

(86) PCT No.: PCT/FR2018/053405
§ 371 (c)(1),
(2) Date: Jun. 19, 2020

(87) PCT Pub. No.: WO2019/122711
PCT Pub. Date: Jun. 27, 2019

(65) Prior Publication Data
US 2021/0084484 A1 Mar. 18, 2021

(30) Foreign Application Priority Data
Dec. 22, 2017 (FR) ...................................... 1763063

(51) Int. Cl.
*H04W 8/18* (2009.01)
*H04W 12/0433* (2021.01)
(Continued)

(52) U.S. Cl.
CPC ......... *H04W 8/18* (2013.01); *H04W 12/0433* (2021.01); *H04W 12/08* (2013.01); *H04W 60/00* (2013.01)

(58) Field of Classification Search
CPC ... H04W 8/18; H04W 12/0433; H04W 12/08; H04W 60/00
(Continued)

(56) References Cited

U.S. PATENT DOCUMENTS 6,754,482 B1* 6/2004 Torabi .................... H04W 8/18
455/410
9,967,806 B2 5/2018 Hullin et al.
(Continued)

FOREIGN PATENT DOCUMENTS

WO 2012160201 A1 11/2012

OTHER PUBLICATIONS

English translation of the Written Opinion of the International Searching Authority dated Jun. 23, 2020 for corresponding International Application No. PCT/FR2018/053405, filed Dec. 19, 2018.
(Continued)

*Primary Examiner* — Joel Ajayi
(74) *Attorney, Agent, or Firm* — David D. Brush; Westman, Champlin & Koehler, P.A.

(57) ABSTRACT

A method for configuring a terminal of a client user of an operator managing a first communications network. The method is implemented prior to the attachment of the terminal to a second communications network, for which transmission resources are temporarily used for routing data from the terminal to a remote server. The method includes receiving, from a control entity of the first network, a management instruction relating to the attachment of the terminal to the second network for a geographical zone. The method further includes configuring a data item relating to the control of the attachment of the terminal on the basis of the received management instruction, and transmitting, to the at least one terminal, at least one configuration parameter for attaching the terminal to the second network.

14 Claims, 6 Drawing Sheets

(51) Int. Cl.
*H04W 12/08* (2021.01)
*H04W 60/00* (2009.01)

(58) Field of Classification Search
USPC .................................................. 455/418, 411
See application file for complete search history.

(56) References Cited

U.S. PATENT DOCUMENTS

| | | | |
|---|---|---|---|
| 2009/0097453 A1* | 4/2009 | Weniger | H04W 8/087 |
| | | | 370/331 |
| 2010/0202381 A1* | 8/2010 | Zhu | H04L 43/18 |
| | | | 370/329 |
| 2013/0225123 A1 | 8/2013 | Adjakple et al. | |
| 2014/0086177 A1 | 3/2014 | Adjakple et al. | |

OTHER PUBLICATIONS

International Search Report dated Feb. 4, 2019 for corresponding International Application No. PCT/FR2018/053405, filed Dec. 19, 2018.
Written Opinion of the International Searching Authority dated Feb. 4, 2019 for corresponding International Application No. PCT/FR2018/053405, filed Dec. 19, 2018.
"3GPP TS 23.501", 3rd Generation Partnership Project; Technical Specification Group Services and System Aspects System Architecture for the 5G System; Stage 2 (Release 15), V15.0.0, (Dec. 2017).
"3GPP TS 32.500", 3rd Generation Partnership Project; Technical Specification Group Services and System Aspects Telecommunication Management; Self-Organizing Networks (SON); Concepts and requirements (Release 14), V14.0.0 (Apr. 2017).

* cited by examiner

METHOD FOR DYNAMICALLY CONFIGURING ENTITIES OF A COMMUNICATIONS NETWORK FOR ROUTING DATA FROM A VISITOR TERMINAL

CROSS-REFERENCE TO RELATED APPLICATIONS

This Application is a Section 371 National Stage Application of International Application No. PCT/FR2018/053405, filed Dec. 19, 2018, which is incorporated by reference in its entirety and published as WO 2019/122711 A1 on Jun. 27, 2019, not in English.

1. FIELD OF THE INVENTION

The application for invention lies in the field of access networks and relates to roaming techniques for a terminal on a set of access networks.

2. PRIOR ART

The pooling of mobile networks with inter-operator roaming has become a strategic challenge for operators in order to reduce their network coverage costs, especially in black spots, that is to say areas not covered by networks, and for which it may be expensive for operators to deploy their specific infrastructures. In particular in areas with a low population density, an operator more often than not deploys a mobile network primarily in order to provide connectivity to its clients, but also for clients of other operators who have not deployed infrastructure in the geographical area. One alternative option to this option consists in deploying a telecommunications infrastructure that is shared between several operators, each operator financing part of the infrastructure in accordance with an agreement signed between the operators. As the case may be, one or more parts of the mobile communication infrastructure may be pooled. Thus, in some cases, only the physical access infrastructure (pylons, antennas, buildings, etc.) is shared. In other cases, the access network (Radio Access Network) or the entire communication network is shared. This network sharing option is relatively difficult to implement due to the security and administrative problems that this entails for clients and operators.

Preferably, one operator takes responsibility for deploying the mobile communication network and for administering this network and allows the clients of other operators to connect (or to attach—in the document attachment is equivalent to connection) in the absence of a network deployed by the operators with which they have subscribed to a service. This roaming service may however lead to service restrictions for the client of a ("visited") operator different from the one ("home") owning the communication network. This client will be called a "visiting" client, whereas the client of the operator administering the mobile communication network will be referred to as a "home" client. In the majority of cases, the roaming service is controlled by the "home" operator which may, according to the circumstances (traffic carried, number of connections, operators, etc.), authorize or not authorize the connections of "visiting" clients or services that "visiting" clients are able to use. In this case, the "visiting" client has a list of "visitor" networks to which it is possible for him to connect in accordance with agreements made between operators. For example, if the visiting client is a client of the operator "V", he will preferably connect to the network "A", otherwise to the network "B", etc. According to another possibility, the "visiting" client may take control of access selection and opt for an operator network himself. In this case, the visiting client may opt for a connection to the network "B" rather than to the network "A". This second option may lead to a connection problem for the visiting client, in particular if the agreement with the operator that he has selected for connection is less rich in terms of functions or limited to certain time slots.

Regardless of the option that is chosen, according to the techniques from the prior art, the "home" and "visited" operators must agree and conclude a contract for the roaming service so that the network equipments of the "visited" operator authorize the connection of the "visiting" client and that traffic counting and the associated billing are carried out in accordance with the contract signed between the operators. To date, it is thus not possible to establish a roaming agreement automatically and on the fly: it is necessary to use the respective information systems of the operators.

However, in certain situations, in particular if the networks available at a given location are managed by operators with which a "home" operator has not concluded a contract, clients may not have connectivity even though access networks may be available. The problem also arises if operators who have signed a contract operate networks that are not available at a given time. In this case, the "visiting" client will not be able to connect to an operator network that has not concluded a contract with the operator of the "home" network. Furthermore, in mobile networks up to the 4G (Fourth Generation) generation, a terminal is not able to attach to a network different from its "home" network if the latter is available. The future generation of networks, called 5G, allows attachment to a visited network even if the "mother" network is available, but nothing is described with regard to the possible interactions between the "home" and "visited" networks, nor on the impacts for terminals. In particular, there is no mechanism for the dynamic and unscheduled implementation of an inter-operator roaming solution, comprising a process of dynamically updating the network equipments in order to authorize the connection of a "visiting" client.

One of the aims of the present invention is to rectify the shortcomings/drawbacks of the prior art that are discussed above and/or to make improvements thereto.

3. DISCLOSURE OF THE INVENTION

The invention aims to improve the situation using a method for configuring at least one terminal of a client user of an operator managing a first communications network, prior to the attachment of at least one terminal to a second communications network whose transmission resources are temporarily used to route data from the at least one terminal to a remote server, the method comprising the following steps implemented by a control entity of the second network:

Receiving, from a control entity of the first network, a management instruction relating to the attachment of the at least one terminal to the second network for a geographical area, Configuring an item of data relating to controlling the attachment of the at least one terminal on the basis of the received management instruction, Sending, to the at least one terminal, at least one configuration parameter for the attachment of the at least one terminal to the second network.

According to the prior techniques, a user's terminal is able to connect to a second communications network, what is called a visited network, alternative to a first communications network, only if it has been preconfigured beforehand, on the basis of roaming contracts signed between the operators managing the two communications networks. The method advantageously makes it possible to modify the configuration of a terminal so that it is able to attach to a second communications network whose operator, called visited operator, does not initially have a roaming contract with the operator, called home operator, with which the user is subscribed. By virtue of the method, the configuration of the terminal is modified dynamically so that it is able to attach to any visited network whose operator has sold or leased resources to the home operator for a geographical area that may be defined with respect to a GPS coordinate of the at least one terminal. If for example the home operator is lacking resources for a period of time and in a geographical area, said home operator purchases or leases capacity from another operator and makes it available to its clients. Since this is possibly capacity that is limited in terms of time and space, the home operator has to transmit configuration information to the visited network and then to the terminal so that the visited network does not reject an attachment request from the terminal and that the terminal has information for attaching to this visited network for which it did not have information before receiving the configuration message. This method thus makes it possible to improve the connectivity of the terminal by allowing it to connect to a larger number of communication networks. The method furthermore makes it possible to make better use of the resources of operators in a given geographical area by virtue of capacity exchange agreements between the operators. In addition, this method makes it possible to improve the quality of user experience by allowing said user to benefit from resources to which he would not have had access in architectures in accordance with the prior techniques. The terminal may furthermore be connected to several networks and receive configuration information associated with the various networks to which it is able to attach, simultaneously or non-simultaneously. According to one example, the terminal may be attached to the first network when it attaches to the second network. Since the attachment consists in the terminal being configured with an IP address, the item of data relating to controlling the attachment may be configured via radio protocols (Wi-Fi, LTE ("Long Term Evolution", 3G, 5G, etc.) or during protocol exchanges preceding the allocation of an IP address to the terminal, for example by a mobile gateway (PDN-GW, GGSN ("Gateway GPRS Support Node")).

According to one particular feature, the management instruction furthermore comprises a date or a duration.

The supply, sale or leasing of resources is only valid for a defined date or duration, or for a date and a duration, which has the advantage for the operator of the visited network of keeping control over its resources while at the same time benefiting from the credit of making resources available to another operator. This duration feature allows the home operator to limit its investments and to take advantage of the resources of the other operator in the event of temporary unavailability or lack of resources for the needs of its clients.

According to one particular feature, the management instruction comprises at least one identifier of the at least one terminal.

The method may advantageously be implemented for a limited number of terminals whose identifier is then transmitted in the management instruction. According to one example, this may involve offering a better quality of service to professional clients or to clients who have subscribed to a better contract, giving them a possibility of improved connectivity. The terminals of these clients are then explicitly identified in the management instruction so that they are able to attach to the visited network. The identifiers of the terminals may be IMEI ("International Mobile Equipment Identity") or MSISDN ("Mobile Station International Subscriber Directory Number") identifiers or a network address, for example an IP address or else a credit account identifier of the user.

According to one particular feature, the management instruction comprises a transaction identifier.

The temporary use of transmission resources of the second network for the needs of a client of the first network requires a transaction between the operators of the two networks. The management instruction may advantageously comprise an identifier of the transaction so as for example to be able to value the transaction and associate it with financial remuneration. The transaction identifier may itself comprise a contract identifier between the two operators, and a transaction number.

According to one particular feature, the management instruction comprises a quantity of credits.

The volume of the resources of the second network able to be used by terminals of the first network is valued in terms of a quantity of credits, for example concluded in a contract between the operators of the two networks. These credits, which may correspond to a duration or to a volume of data or to a monetary sum, represent the volume of resources allocated by the second network. The second network implements a counter used to prevent the terminals of the first network from exceeding the quantity of credits relating to the transaction and transmitted in the management instruction sent by the control entity of the first network.

According to one particular feature, the item of data relating to controlling the attachment comprises filtering rules.

The entities of the second network, comprising the eNodeB, the S-GW (Serving Gateways), PDN-GW (Packet Data Network Gateways), the HSS (Home Subscriber Server) are, according to the prior techniques, configured so as not to authorize the attachment of terminals other than those benefiting from a subscription or having a roaming contract with the operator of the second network. According to the configuration method, these equipments should in particular be configured dynamically so as to authorize the attachment of terminals of other operators for a given geographical area. The geographical area may be identified by geographical coordinates or by a network location (cell-ID ("Cell-Identifier"), LAI ("Location Area Identity"), TAI ("Tracking Area Identifier").

According to one particular feature, the item of data relating to controlling the attachment comprises at least one criterion used to authorize or not authorize the attachment of the terminal.

The criterion may in particular comprise an item of information relating to the number of terminals attached or to a volume of information transmitted, or to an attachment duration of the at least one terminal or to an application used by the at least one terminal or else several items of information proposed above. The supply, sale or leasing of resources may have a number of simultaneous attachments of terminals to the second network as parameter. In this case, the second network counts the terminals of the operator of the first network that are attached to the second network and prohibits the attachment of new terminals when the threshold is reached. It may also disconnect terminals if the quota is reached and for example if it needs to authorize the attachment of a "priority" terminal of the first network. The second network thus keeps resources available for its clients. As an alternative or in addition, the supply, sale or leasing of resources may have a volume of data or a duration or an application as parameter, for example, in order to limit the number of SMS/MMS routed by the second network. These parameters are used to limit the use of transmission resources by the terminals of the operator of the first network, in accordance with a reservation or leasing contract established between the operators of the first and second networks. It is necessary to monitor the data relating to the terminals of the clients of the operator of the first network in order to prohibit, if necessary, the attachment of new terminals if the permitted data threshold is reached.

According to one particular feature, the at least one configuration parameter comprises a transaction identifier.

A transaction identifier corresponding to the temporary allocation of resources by the second network for terminals of the first network may advantageously be shared between the operators and possibly transmitted to the terminal. The second network and possibly the first network may then recover the information associated with the transaction (such as the identifiers of the terminals used to attach to the second network) and may then count the terminals and the data, decrement the credits, and count the durations of the terminals corresponding to the transaction identifier.

According to one particular feature, the at least one configuration parameter comprises a security key of the operator managing the first network.

According to the prior techniques, a configuration of a terminal is modified by the operator with which a subscription contract is signed by the user of the terminal. According to the method, a configuration parameter is transmitted by the second network, which may pose security and trust problems for the network transmitting configuration information. The configuration parameter may advantageously comprise a security key of the operator of the first network that the second network will have obtained beforehand, in the received management instruction according to one example, and that the terminal may use in order to ensure that this is not an instruction that could be harmful thereto. This security key may be associated with the validated and certified unique transaction identifier, encrypted with the public keys of the operators involved in the transaction.

According to one particular feature, the at least one configuration parameter comprises a validity duration for attaching to the second network.

The terminal should not attempt to attach to a network for which the operator of the first network has not or has no longer leased or reserved transmission resources. According to the prior art, techniques relating to roaming require transmitting a new configuration to the terminal in order to add or delete a network, identified by a PLMN ID ("Public Land Mobile Network Identifier"), to which the terminal is able to attach in a roaming situation. The validity duration may correspond to an effective duration or else to a date or else to a date and a duration. The validity duration makes it possible not to send a new configuration parameter when a network should no longer be used and therefore to save network resources by avoiding the sending of access attempts by the terminal.

According to a second aspect, what is proposed is a configuration device comprising means for configuring at least one terminal of a client user of an operator managing a first communications network, prior to the attachment of the at least one terminal to a second communications network whose transmission resources are temporarily used to route data from the at least one terminal to a remote server, implemented in a control entity of the second network and comprising:

a receiver, able to receive, from a control entity of the first network, a management instruction relating to the attachment of the at least one terminal to the second network for a geographical area, a configuration module, able to configure an item of data relating to controlling the attachment of the at least one terminal on the basis of the received management instruction, a transmitter, able to send, to the at least one terminal, at least one configuration parameter for the attachment of the at least one terminal to the second network.

This device is able, in all of its embodiments, to implement the configuration method that has just been described. This device is intended to be implemented in a control equipment of a network.

According to a third aspect, what is proposed is a terminal of a client user of an operator managing a first communications network, able to attach to at least one second communications network whose transmission resources are temporarily used to route data from the terminal to a remote server, comprising:

a receiver able to receive,
 from a control entity of the second network, at least one configuration parameter for attaching the at least one terminal to the second network,
 an attachment control message comprising conditions of attachment to the second network,
a configuration module for updating the list of networks that it is able to access and the geographical area associated with the networks.

According to one particular feature, the terminal is attached to the second network using a number of user credits.

The terminal, which has a number of user credits at its disposal, will have the possibility of accessing the second network on the basis of the quantity of these credits. This makes it possible to limit the possibilities of accessing the second network and to prevent a visitor terminal from consuming too many resources of the second network.

The invention also relates to a computer program comprising instructions for implementing the steps of the configuration method that has just been described when this program is executed by a processor.

This program may use any programming language, and be in the form of source code, object code, or of intermediate code between source code and object code, such as in a partially compiled form, or in any other desirable form.

The invention also targets a computer-readable information medium comprising instructions of the computer program as mentioned above.

The information medium may be any entity or device capable of storing the programs. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from an Internet network.

Alternatively, the information medium may be an integrated circuit in which the program is incorporated, the circuit being designed to execute or to be used in the execution of the methods in question.

4. PRESENTATION OF THE FIGURES

Other advantages and features of the invention will become more clearly apparent on reading the following description of particular embodiments of the invention, given by way of simple illustrative and non-limiting examples, and of the appended drawings, among which.

5. DETAILED DESCRIPTION OF AT LEAST ONE EMBODIMENT OF THE INVENTION

In the remainder of the description, examples of several embodiments of the invention are shown in a communication infrastructure, which may be fixed and/or mobile.

Figure 1:
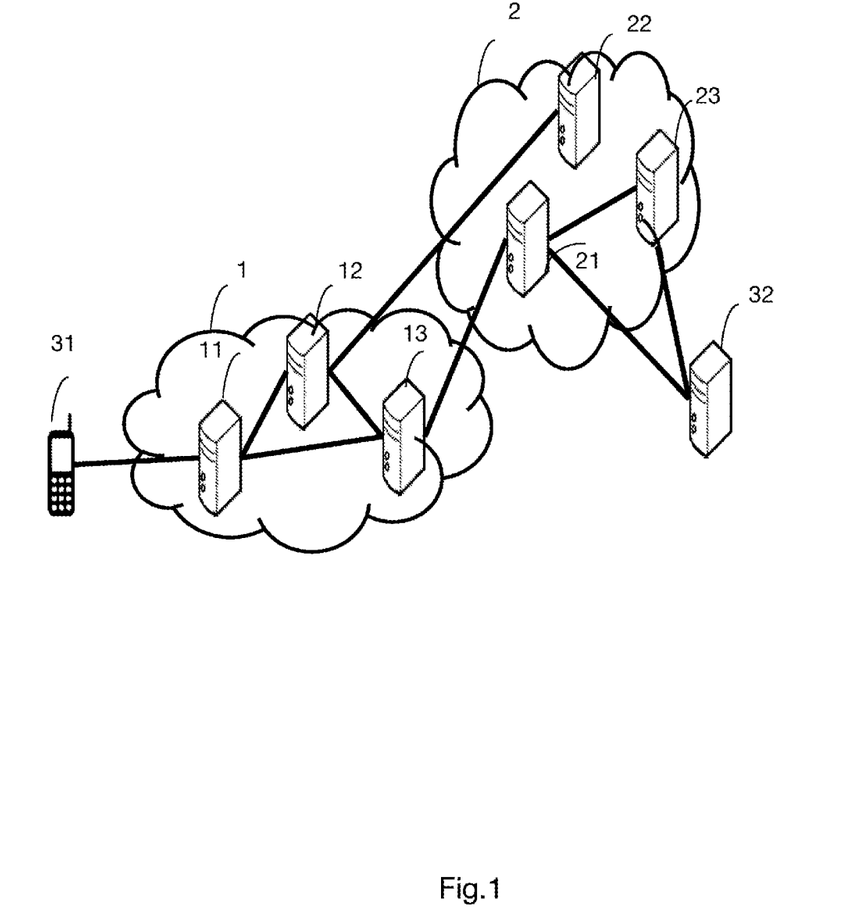
FIG. 1 shows an architecture of a roaming service between two communications network operators using techniques from the prior art.

Reference is made first of all to FIG. 1, which shows an architecture of a roaming service between two communications network operators using techniques from the prior art. The "home" operator manages the communications network 2 and the "visited" operator manages the communications network 1. In the remainder of the description, reference will be made to the "visited" network, meaning the communications network managed by the visited operator, and the "home" network, the network managed by the "home" operator.

The user of the terminal 31 has subscribed to a subscription with the "home" operator, authorizing its terminals to attach to the networks managed by the "home" operator under the conditions described in the subscription. In FIG. 1, the terminal is able to attach directly to the network 2. The "home" operator has also signed what is called a roaming contract allowing the terminals of clients who have a subscription therewith to attach to other networks managed by operators with which the "home" operator has signed a roaming contract.

The terminal attaches to the network 1, whose operator has signed a roaming contract with the operator of the network 2. This roaming contract allows the terminals of the clients of the operator of the network 1 to be able to attach to multiple networks, on the basis of the contracts signed between the operators. These contracts, once they have been signed, involve configuring the network equipments so as to be able to authorize the attachment of the terminal 31 to the network 1, to be able to route the data from the terminal 31 to their destination and to be able to bill the routing service in accordance with the signed contract. The terminal thus attaches to an entity 11 of the communications network 1.

The entity 11 may indiscriminately be a NodeB station, an eNodeB station, a BTS ("Base Transceiver Station") station or else an access station of a fifth-generation network. This device 11 is connected to a management entity 12, for example an MME ("Mobility Management Entity") entity and to a routing entity 13, for example an S-GW ("Serving Gateway") entity. The (MME) entity 12 of the network 1 is interconnected, more often than not indirectly via an interconnection network, to a routing entity of the network 2, for example a PDN-GW entity. The entity 12 is moreover connected to a subscriber management entity 22, which may be an HSS ("Home Subscriber Server") entity, in particular in order to authorize or not authorize the attachment of the terminal 31 to the network 1. The network 2 furthermore comprises a flow control entity 23, which may be a PCRF ("Policy and Control Rules Function") entity. The data from the terminal 31 are thus routed via the network 1 and then the network 2, in the case of what is called a "Home Routed" architecture, to the data server 32. It should be noted that roaming contracts are signed between operators regardless of the real-time connectivity needs of the terminals. Specifically, these contracts require what are called static configurations in order for a network to be able to route data from user terminals that are not clients of the operator managing the network in question.

Figure 2:
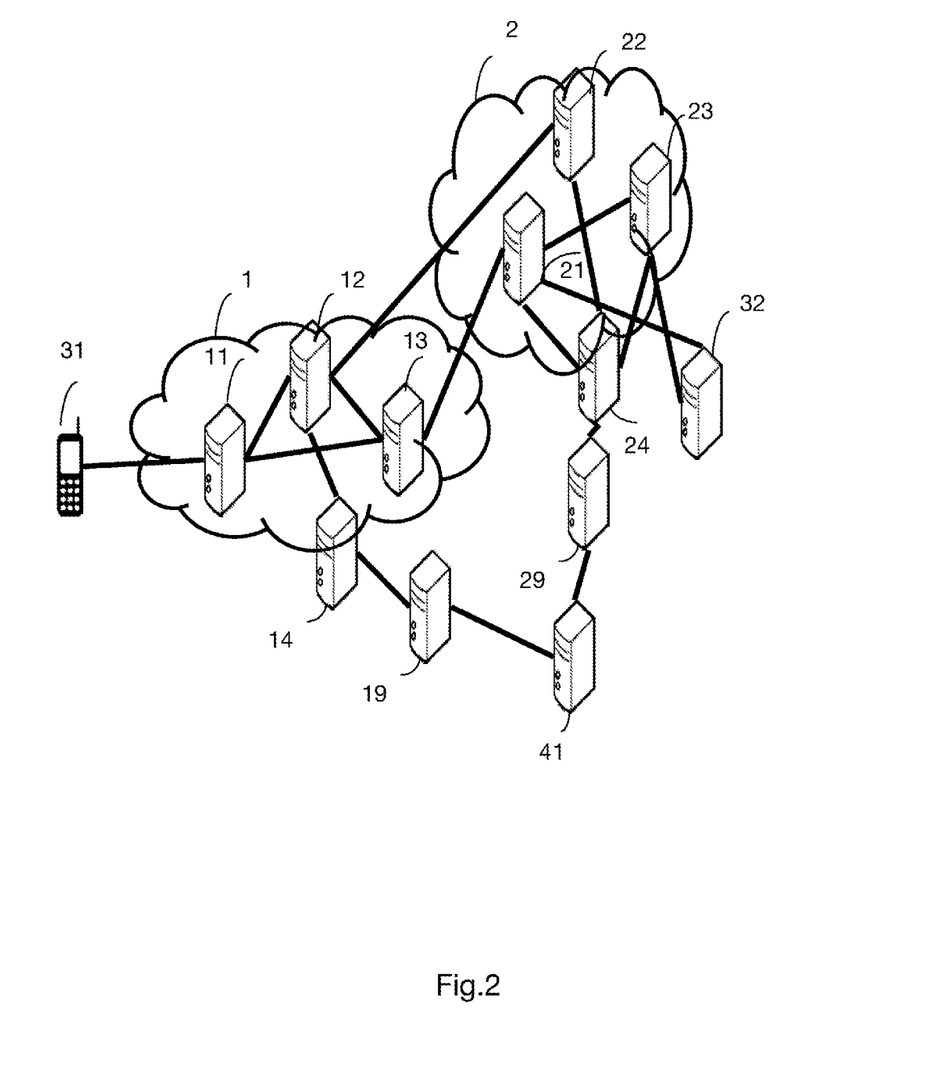
FIG. 2 shows an architecture of a roaming service between two communications network operators in which the configuration method is implemented, according to a first embodiment.

FIG. 2 shows an architecture of a roaming service between two communications network operators in which the configuration method is implemented, according to a first embodiment.

The following changes from FIG. 1 are taken into consideration in this FIG. 2.

According to one example, the user of the terminal 31 may purchase a roaming service via credits (also called tokens). The credits are available for example in the digital wallet of the user of the terminal 31, which is attached to the account of the user subscribed to the operator of the network 2 (Home). The terminal may use these credits on visited networks. It should be noted that the credits could also be used by the user to connect to the network 2 if the subscription to the operator of the network 2 involves providing a number of credits to attach to the network 2.

This FIG. 2 also differs from FIG. 1 through the addition of new entities. The entity 14 in the network 1 is a management entity of the network 1 whose purpose is to obtain information relating to the traffic carried in the network 1, for example via probes or specific entities that are not shown in FIG. 2, and to reconfigure entities of the network 1 if necessary. In particular if the traffic in the network 1 is poorly balanced between the various entities, it may reconfigure the entities of the network 1 in order to better distribute the traffic. The entity 14 may for example be based on the 3GPP TS 32.500 specification (version 14.0.0 of Apr. 4, 2017). In the same way, an entity 24 having the same function as the entity 14 for the network 1 is deployed in the network 2. These two entities 14 and 24 are moreover connected to an entity 41 via a respective NEF1 entity 19 and NEF2 entity 29 ("Network Exposure Function"), which are the entities that describe the resource-sharing services (supply and demand) of each respective network 1 and 2. The entity 41 may be managed by one of the two operators of the networks 1 and 2 or else by an external entity that may for example be co-managed by the two operators (it may be a transaction register database distributed between the operators and recording information regarding transactions performed between the operators). The purpose of this entity is to manage demand (for example purchases) and/or supply (for example sales) of transmission resources between the operator of the network 1 and the operator of the network 2. This entity may be connected to several communications networks so as to form a location for negotiating resources. According to one example, the entities 14 and 24 may be connected directly via their NEF entity (NEF1 19 and NEF2 29) and negotiate resources peer-to-peer. When a network has more transmission resources than necessary, it makes them available to other operators. If operators are lacking said resources, they will dynamically lease or purchase said resources from those who have more thereof than necessary, that is to say in order to respond for example to a transmission resources availability problem. This problem may be temporary and/or geographical and is a beneficial alternative to building networks. The transmission resources may be radio frequencies, bandwidth on infrastructures, routing capacities in entities or else processing capacities. Specifically, virtualization techniques allow resources to be made available in a more agile manner.

According to one embodiment, the supply and demand of resources between two or more operators may be identified by a transaction identifier. The transaction identifier is unique and may, according to one example, be associated with a number of credits corresponding to a volume of resources made available by one operator to the other operator(s). The transaction may comprise a number of credits that users of terminals benefiting from the transaction may consume. Each transaction that is validated, that is to say having had agreement from the operators involved in the transaction, is recorded with a unique transaction identifier in a transaction register database that may be distributed between the operators. The unique transaction identifier makes it possible for example to associate:

- the identifiers of the terminals (MSISDN or IMEI or IP address for example) of the users benefiting from the agreement and possibly the account identifier of the users and the account status (the number of credits) of the users,
- the identifier of the operator (or the identifiers of the operators) requesting a resource for its clients and the status of its account (number of credits),
- the identifier of the operator of the transaction that supplies a resource for one (or more) operator(s) and the status of its account (number of credits),
- the cost of the transaction in credits.

This unique transaction identifier is validated and created if the credits contained in the account of the operator requesting a resource and/or the credits contained in the accounts of the clients benefiting from the offer are available. Specifically, the network 1 will allocate credits to clients of the network 2, in accordance with the content of the transaction identified by a unique transaction identifier, which the network 2 has to pay for in credits, as part of an exchange, or in currency. The transaction register database may also be used to verify that the balance between the accounts of the operators is not excessively unbalanced in order to ensure the correct sharing of resources between operators.

Figure 3:
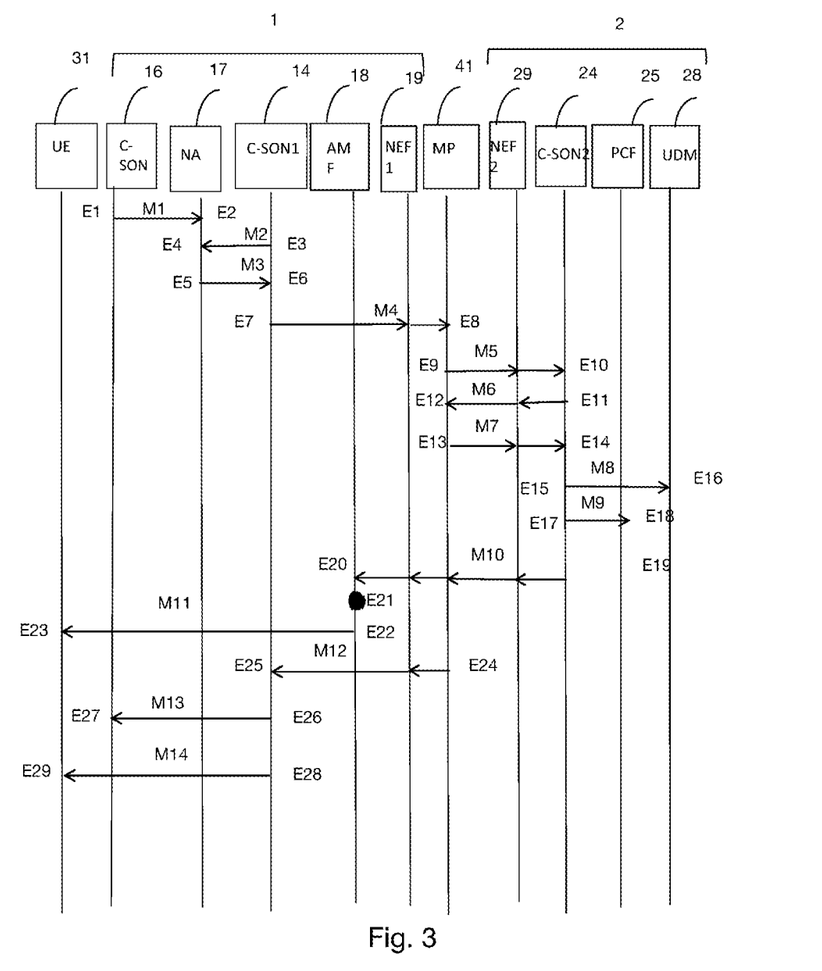
FIG. 3 shows an overview of the method for configuring a terminal, according to a second embodiment of the invention.

FIG. 3 shows an overview of the method for configuring a terminal, according to a second embodiment of the invention. This embodiment is implemented in a 5G network architecture as defined in document 3GPP TS 23.501 (Version 12/2017).

In step E1, a C-SON ("Centralized Self-Organizing Network") entity 16, managing the resources of the access networks of the network 1, transmits, to an NA ("Network Analytics") entity 17, a message M1 comprising information regarding the radio antenna capacities of the access networks of the network 1.

The purpose of the C-SON entity 16 is to automatically update the configurations of the network equipments in order to balance the load and in particular optimize the use of the various equipments. This message M1 is transmitted periodically. A C-SON1 management entity 14 of the entire network 1, in step E3, transmits a message M2 comprising information regarding the terminals attached to the network 1 as well as the identifiers of these terminals to the NA entity 17. On the basis of these data received from the C-SON1 entity 14 in step E2 and from the entity 16 in step E4, the NA entity 17 predicts availabilities of resources or absences of resources. It may for example make predictions on the basis of historical data and of the variation in the number of attached terminals. In step E5, the NA entity 17 transmits these predictions to the C-SON1 entity 14 in a message M3. Upon receiving the message M3 in step E6, the entity 14 transmits a message M4 to an MP ("Market Place") entity 41 for managing transmission resources for a set of operators via the NEF1 entity 19. The MP entity 41 receives the message M4 in step E8 and is informed, by this message M4, that the operator of the network 1 has transmission resources or is lacking resources. It is considered in this embodiment that the network 1 has resources greater than the needs that it predicted. The message M4 may comprise an item of information regarding the number of terminals of other operators that the network 1 is able to accommodate, the number of credits that it is able to offer, the date and the duration for which the resources are able to be leased, the volume of data able to be routed by the network 1 on behalf of another operator as well as the geographical area of validity of this resource offer. The MP entity 41 periodically receives the message M4, and the other operators for which it manages the transmission resources also transmit their resource proposals or their needs. According to one example, it is considered that the network 2 transmits a message, not shown in the figure, indicating a need for resources to the entity 41.

In step E9, the MP entity 41 transmits, to the C-SON2 management entity 24 of the network 2 (corresponding to the entity 14 for the network 1), a message M5 comprising an offer of transmission resources of the network 1 via the NEF2 entity 29. This offer may comprise an item of information regarding the number of terminals of the operator of the network 2 able to attach to the network 1, the number of credits offered, the duration for which the resources are able to be leased, the volume of data able to be routed by the network 1 on behalf of the network 2 as well as the geographical area of validity of this resource offer. This offer may be offered to several operators who have indicated needs for resources. This offer is received by the C-SON2 entity 24 in step E10 via the NEF2 entity 29.

In step E11, the C-SON2 entity 24 transmits a message M6 comprising a request to reserve or to lease transmission resources of the network 1 to the MP entity 41 via the NEF2 entity 29. As the case may be, this request comprises some or all of the following items of information:

- a number of terminals to be connected,
- a desired date and duration of purchase or leasing,
- a desired geographic area,
- a type of technology (UMTS ("Universal Mobile Telecommunications System"), WLAN ("Wireless Local Area Network"), LTE ("Long Term Evolution")),
- a volume of data to be transmitted
- a number of credits.

In this embodiment, the MP entity 41 receives the request in step E12 and grants the resources via the NEF2 entity 29. In step E13, the MP entity 41 validates the request in a message M7, which it transmits to the entity 24 via the NEF2 entity 29. It may also assign a transaction identifier for this request. The message M7 may modify the information present in the request in the message M6 and furthermore comprises one or more identifier(s) of network(s) to which the terminals of the network 2 are able to attach according to the conditions relating to the information transmitted in the message M7 received by the C-SON2 entity 24 in step E14, via the NEF2 entity 29. The message M7 furthermore contains the identifier of the unique transaction validated and assigned by the MP entity 41.

Once resources have been reserved or leased, the entities of the respective networks 1 and 2 have to be configured such that terminals subscribed to the operator managing the network 2 are able to attach to the network 1 according to the methods of the transaction.

In step E15, the C-SON2 entity 24, in a message M8, updates the profiles of the terminals able to attach to the network 1 in the UDM ("Unified Data Management") entity 28 in order to add the new option of attaching the terminals to the network 1 and the associated conditions, in particular connectivity authorization, authentication and quality of service, as well as the technologies for which the transaction is valid. The UDM entity 28, upon receiving the message M8 in step E16, updates the profiles of the terminals. According to one alternative, the profiles of a limited number of terminals may be updated on the basis of their geographical position or their contract, for example if they benefit from an enhanced connectivity offer or if they have credits in the wallet associated with the user's account.

In step E17, the C-SON2 entity 24 also updates the PCF ("Policy and Control Function") control entity 25 by sending a message M9. This message M9 comprises an item of information for indicating to the PCF, upon receiving the message M9 in step E18, to update the attachment policies associated with the terminals involved in the method and in particular the associated billing for the geographical area in question and the unique transaction identifier. According to one alternative, the entity 24 may also send a message M9 to the PCF or PCRF devices of the network 1 in particular if the transaction is valid for what are called "Local Breakout" services or the network 1 directly routes the data from the terminals of the network 2 to their destination without using devices of the network 1.

In step E19, the PCF entity 25 transmits to an AMF ("Access and Mobility Function") control entity 18 of the network 1 by transmitting in a message M10 comprising a management instruction for the attachment of the client terminals of the operator to the network 2 for a given geographical area. This instruction indicates to the control entity 18 that the terminals having an identifier corresponding to the operator of the network 1 should be able to attach to the network 2 in the indicated geographical area. According to one alternative, this instruction comprises a validity duration for which the terminals are able to attach. According to another alternative, if the instruction is valid only for a set of terminals, the identifiers of these terminals are also transmitted in the instruction of the message M10. According to another alternative, the message M10 comprises an application for which the transaction is valid. According to yet another alternative, the message M10 comprises a transaction identifier. According to yet another alternative, the message M10 comprises a validity duration for which the terminals of the network 2 are able to attach to the network 1. According to yet another alternative, the message M10 comprises a number of credits that may be consumed by the terminals of the network 2 for their attachment to the network 1.

Upon receiving the message M10 in step E20, the AMF entity 18 of the network 1 updates its configuration by authorizing attachment of the terminals identified in the message M10 as well as the validity duration and the other parameters present in the message M10. According to one alternative, this modification consists in adding filtering rules that the entity 18 may then communicate to the other entities of the network 1 in order to authorize or not authorize the attachment of the terminals of the operator of the network 2. According to one example, updating the configuration comprises a threshold corresponding to the number of terminals of the network 2 able to be attached to the network 1. The purpose of this threshold is to limit the use of the resources of the network 1 by the terminals of the network 2. According to another example, updating the configuration comprises a maximum value of data routed by terminals of the network 2 or else a number of credits associated with the transaction. The client terminals of the network 1 thus do not risk lacking resources at a given time provided that credits or the terminals have not reached a threshold relating to the transaction.

In a step E22, the AMF control entity 18 sends a message M11 comprising a configuration parameter to the terminal 31 subscribed to the operator of the network 2, so that the terminal 31 is able to attach to the network 1. The message M11 may also comprise information relating to a modification of the attachment parameters. The message M11 may also comprise information informing the terminal 31 that it should no longer attach to the network 1. The control entity may transmit this information to all of the terminals of the operator 2 with an indication of the geographical area within which they are able to attach to the network 1 or else only to the terminals whose identifiers were received in the message M10. The AMF entity 18 may transmit the message M10 only to the terminals that are already attached, or else transmit the message to the terminals including if they are not attached, that is to say on standby, or else only when the terminal arrives in the geographical area. This message M11 is reproduced only for the terminal 31 in FIG. 3, but it is also transmitted to the other terminals of the operator of the network 1 or some of these terminals. The AMF of the network 2 may receive the message M10 in the same way from the PCF of the network 2.

In step E23, the terminal 31 receives the message M11 and updates its configuration in order to be able to effectively request to attach or modify its attachment to the network 1. This configuration consists for example in adding the network 1, and in particular the identifier PLMN transmitted by the AMF entity 18, to its list of networks, possibly the date and the duration for which it is able to attach thereto and the geographical area within which it may request to attach thereto.

In step E24, the MP entity 41 sends a message M12 acknowledging the offer of resources to the C-SON1 entity 14 via the NEF1 entity 19. This message M12 may be transmitted indiscriminately before the transmission of the message M11 by the entity 18. This message may be transmitted at the same time as the transmission of the message M7. The C-SON1 entity 14 receives this acknowledgement, via the NEF1 entity 19, in step E25, thereby allowing it to take into account the new attachments to the network 1 and to integrate them into future messages M2 comprising the attached terminals. This message M2 in particular comprises the validated unique transaction identifier, making it possible to update the wallets of the client and/or operator accounts.

In step E26, the C-SON1 entity 14 transmits a message M13 for configuring the access equipments in order to authorize or not authorize the attachment of the terminals to the network 1. The message M13 also makes it possible to modify the attachment conditions if necessary, for example to prohibit mobility on radio technology in a geographical area. The message M13 is transmitted to the C-SON entity 16 that manages the access networks. This entity 16 is then responsible for updating the configuration of the access networks in accordance with the message M13 received in step E27.

In step E28, the C-SON1 entity 14 transmits an attachment control message M14 to the terminal 31. The purpose of this message is to supplement the configuration information of the terminal 1 received in particular in the message M11 and to indicate to it, for example, the conditions of attachment to the network 1. For example, if the network 1 offers various types of access technology (UMTS (Universal Mobile Telecommunications System), WLAN (Wireless Local Area Network), LTE (Long Term Evolution)), it may indicate thereto which types of access are authorized or not authorized, such that the terminal 31 is not rejected in the event of attempting to attach to a network using technology not included in the agreement. The terminal 31 updates its configuration upon receiving the message M14 in step E29 and, from this moment, is able to attach to the network 1 under the conditions that are communicated thereto in the messages M11 and M13. The message M14 may also contain information regarding the transactions performed by its operator with the credits used during the transactions and the remaining number of credits in the user account.

Figure 4:
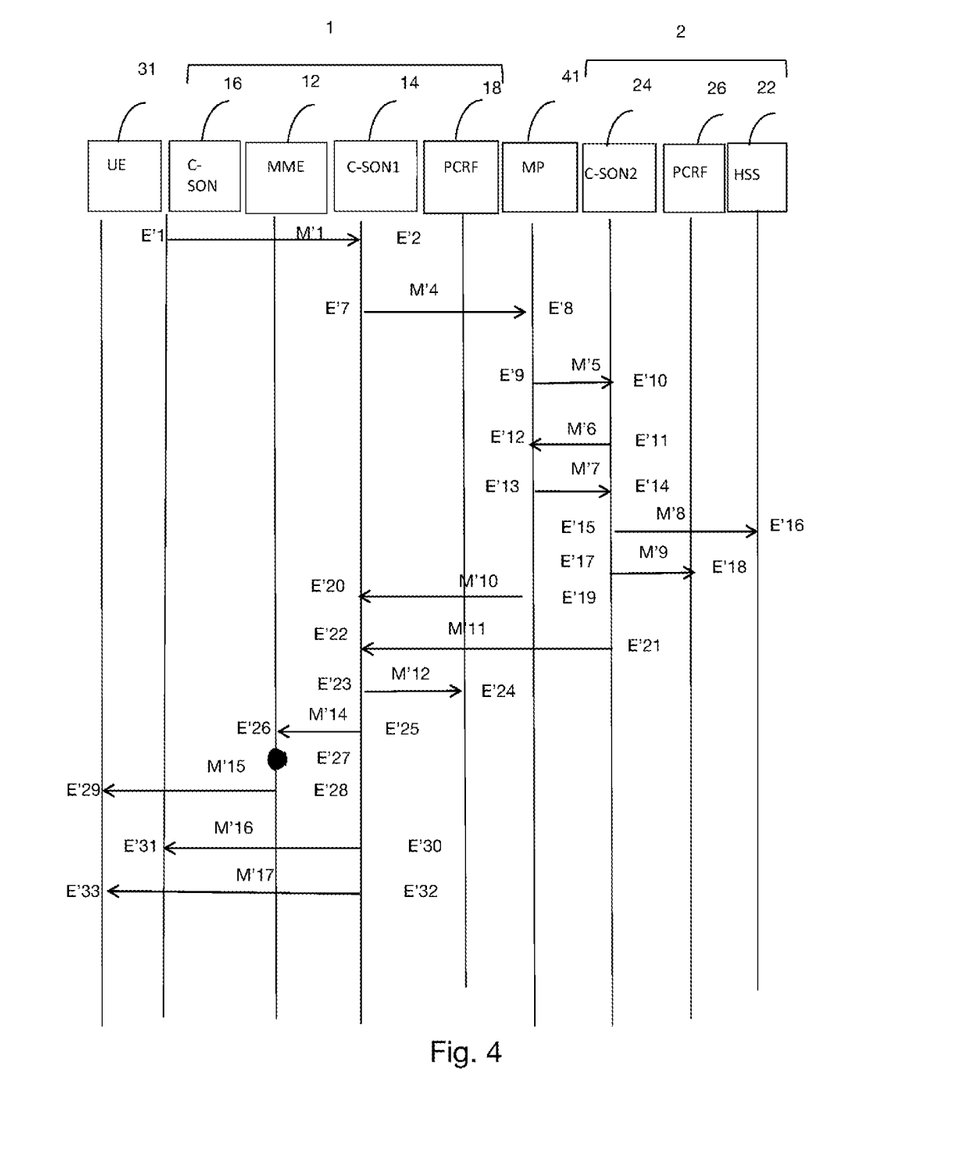
FIG. 4 shows an overview of the method for configuring a terminal, according to a third embodiment of the invention.

FIG. 4 shows an overview of the method for configuring a terminal, according to a third embodiment of the invention. Entities in the figure corresponding to the entities described in FIGS. 1 and 2 are identified by the same numbers in FIG. 4. In this FIG. 4, compared to FIG. 3, the network 1 does not have an NA entity 17.

Steps E'1 to E'14 are identical to steps E1 to E14 in FIG. 3, with the difference that there is no step E'3 to E'6 in FIG. 4 due to the absence of an NA entity. The entity 16 thus transmits statistics regarding the use of the access networks to the C-SON1 entity 14 in a message M'1, and the entity 14 transmits the information regarding the connected terminals and the availability or the lack of resources in a message M'4 transmitted to the entity 41.

Steps E'15 to E'18 are identical to steps E15 to E18, with the difference that the PCRF control entity 26 replaces the PCF entity and the HSS entity 22 replaces the UDM entity of FIG. 3, but taking their respective roles and also proposing the alternatives indicated in FIG. 3.

In step E'19, the MP entity 41 sends a message M'10 acknowledging the offer of resources to the C-SON1 management entity 14. This message contains information regarding the dynamic roaming agreement concluded in a contract with the operator of the network 1 and in particular a unique transaction identifier making it possible to recover the information regarding the identifiers of the accounts of the parties of the contract, and the price of the transaction in credits, in a transaction register database. The message M'10 furthermore comprises the feature relating to the valid geographical area in the agreement. The entity 14 receives this message M'10 in step E'20 and adopts the position of having to configure the entities of the network 1 in order to allow the agreement to be implemented.

In step E'21, the C-SON2 management entity 24 of the network 2 transmits a message M'11 to the C-SON1 management entity 14 of the network 1 in order to indicate thereto the criteria relating to the agreement. This may be a simple notification of the agreement for the terminals of the clients of the operator 2, possibly supplemented with a date and a validity duration of the agreement, a number of credits, a list of terminals and their identifiers for which the agreement is valid and possibly also a list of technologies of the network 1 for which roaming is valid or even information regarding the associated type of billing. The unique transaction identifier makes it possible to retrieve the identifiers of the accounts that will be debited for the use of resources of the visited network from the register database.

Upon receiving the message M'11 in step E'22, the C-SON1 entity 14 sends a configuration message M'12 to the PCRF control entity 18 of the network 1 in step E'23. This message in particular comprises filtering and counting policies and the unique transaction identifier for retrieving the information necessary for billing the terminals of the network 2 that will attach to the network 1. The entity 18 updates its configuration with the information received in step E'24.

In step E'25, the C-SON1 entity 14 sends a message M'13 to the MME (Mobility Management Entity) entity 12 comprising an instruction for managing the attachment of the terminals that will attach to the network 1 in accordance with the contract. The management instruction consists in determining the policy associated with a terminal of the network 2 in the MME entity 12. Since the entity 12 in particular has the role of managing access control and the access rights, in step E'27, it configures the rights linked to the terminals able to attach to the network 2 upon receiving the message M'13 in step E'26. The entity 14 is thus able to control the attachment of the terminals in accordance with the instruction received indirectly from the control entity 24 of the network 2.

In step E'28, the MME entity 14 transmits a message M'15 comprising a configuration parameter to the terminal 31. This message corresponds to the message M11 in FIG. 3 and is received by the terminal 31 in step E'29.

Steps E'30, E'31 and the message M'16 correspond respectively to steps E26 and E27 and to the message M13 in FIG. 3. The message M'16 allows the C-SON1 entity 16 to then determine the monitoring information of the networks and in particular the number of terminals attached in the geographical area, the volume of data transmitted, the technologies and the services (voice, data, etc.), the credits available from the accounts identified in the validated transactions (the remaining credits) used by the terminals.

Steps E'32, E'33 and the message M'17 correspond respectively to steps E28, E29 and the message M14 in FIG. 3. According to one variant, the message M'17 may be sent by the C-SON2 management entity 24 in particular if the operator 2 wishes to keep control of the attachment policy (priority of networks, priority of technologies, etc.), for example in connection with a policy defined in an architecture based on ANDSF ("Access Network Discovery and Selection Function") technology implemented by the operator 2.

According to one alternative, the steps relating to the conclusion of a contract and in particular steps E'7 to E'14 may be replaced by direct negotiation between the operators of the networks 1 and 2 without involving any entity 41. The operators 1 and 2 agree to lease transmission resources, for example on the basis of a number of credits, when one of the two needs these transmission resources, which requires dynamically configuring the control entities and the terminals on the basis of the leased resources and the geographical area in question.

The terminal 31 may then attach to the network 2 in accordance with the information present in the messages M'15 and M'17. The attachment of the terminal to the network 2 is not shown in FIG. 4.

Figure 5:
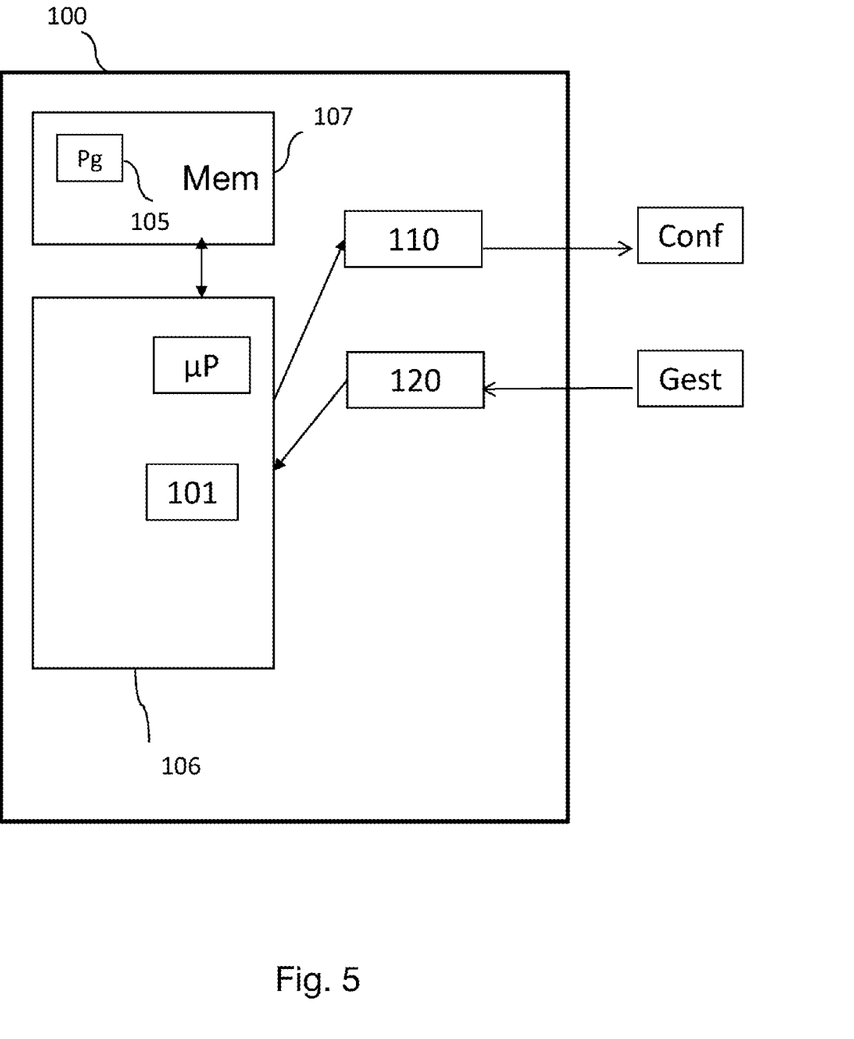
FIG. 5 shows an exemplary structure of a configuration device, according to one aspect of the invention.

With reference to FIG. 5, an exemplary structure of a configuration device 100 according to one aspect of the invention is shown.

The configuration device 100 implements the configuration method, various embodiments of which have just been described.

Such a device 100 may be implemented in a control device of a communication network, such as an MME or AMF entity.

For example, the device 100 comprises a processing unit 106, equipped for example with a microprocessor µP, and driven by a computer program 105, stored in a memory 107 and implementing the routing method according to the invention. On initialization, the code instructions of the computer program 105 are for example loaded into a RAM memory, before being executed by the processor of the processing unit 106.

Such a device 100 comprises:
- a receiver (120), able to receive, from a control entity of the first network, a management instruction (gest) relating to the attachment of the at least one terminal to the second network for a geographical area,
- a configuration module (101), able to configure an item of data relating to controlling the attachment of the at least one terminal on the basis of the received management instruction,
- a transmitter, able to send, to the at least one terminal, at least one configuration parameter (conf) for the attachment of the at least one terminal to the second network.

Figure 6:
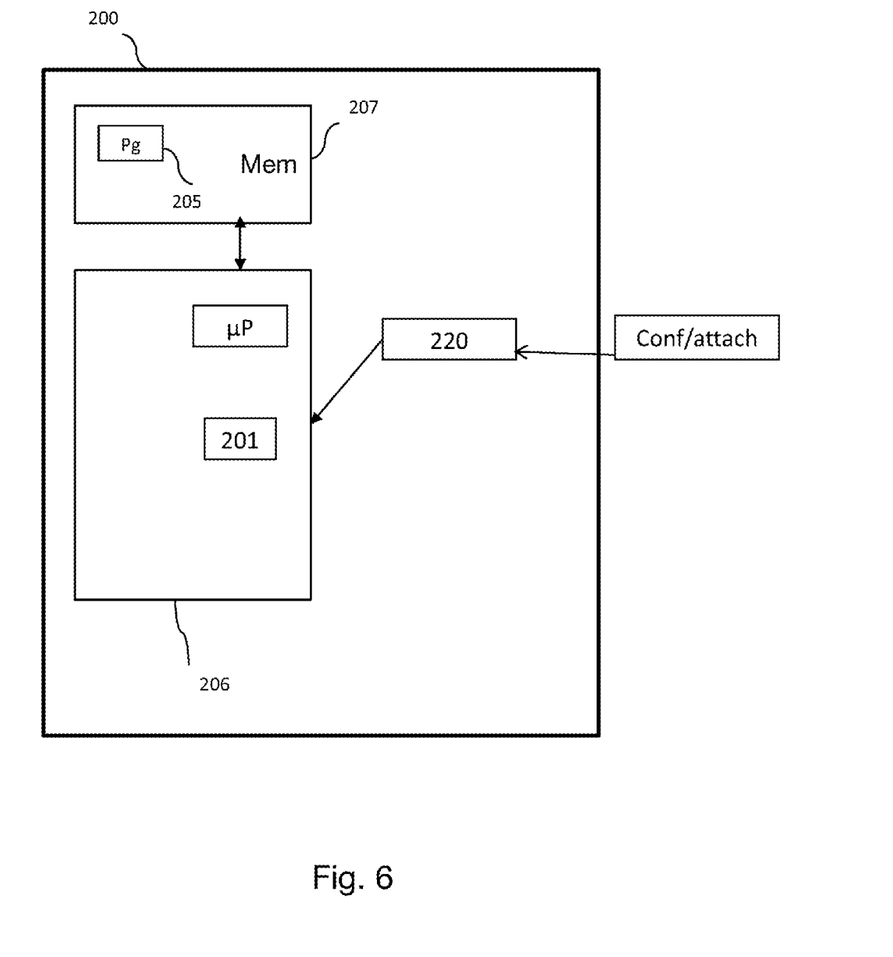
FIG. 6 shows an exemplary structure of a terminal according to one aspect of the invention.

With reference to FIG. 6, an exemplary structure of a terminal according to one aspect of the invention is shown.

Such a terminal 200 may be implemented in a mobile terminal, a fixed terminal or any type of end equipment attaching to a fixed or mobile communication network.

For example, the device 200 comprises a processing unit 206, equipped for example with a microprocessor µP, and driven by a computer program 205, stored in a memory 207 and implementing the routing method according to the invention. On initialization, the code instructions of the computer program 205 are for example loaded into a RAM memory, before being executed by the processor of the processing unit 206.

The terminal 200 comprises:
- a receiver (220) able to receive,
  - from a control entity of the second network, at least one configuration parameter (conf) for attaching the at least one terminal to the second network,
  - an attachment control message (attach) comprising conditions of attachment to the second network,
- a configuration module (201) for updating the list of networks that it is able to access and the geographical area associated with the networks.

The invention claimed is:
1. A method comprising:
dynamically configuring a set of at least one terminal of at least one client user of an operator managing a first communications network, prior to attachment of the at least one terminal to a second communications network whose transmission resources are temporarily used to route data from the at least one terminal to a remote server,
the configuring being performed by a control entity of the second network and comprising the following acts each performed by the control entity before the at least one terminal requests attachment to the second network:
receiving, from a control entity of the first network, a management instruction enabling the attachment of the at least one terminal to the second network for a geographical area, wherein the management instruction comprises an identifier of each of the at least one terminal in the set and an item of information that limits attachment duration of the at least one terminal to the second network,
configuring the control entity to authorize the attachment of the at least one terminal to the second network on the basis of the received management instruction and the item of information limiting attachment duration of the at least one terminal to the second network, and
dynamically configuring the at least one terminal by sending, only to the at least one terminal of the set for which the identifier was received, at least one configuration parameter that enables the at least one terminal to attach to the second network for the limited attachment duration, the at least one terminal lacking pre-configuration data for attaching to the second network prior to the sending.

2. The configuration method as claimed in claim 1, wherein the item of information limiting attachment duration comprises a date or a duration.

3. The configuration method as claimed in claim 1, wherein the management instruction comprises the at least one identifier of the at least one terminal for which the management instruction is valid.

4. The configuration method as claimed in claim 1, wherein the management instruction comprises a transaction identifier.

5. The configuration method as claimed in claim 1, wherein the item of information limiting attachment duration comprises a quantity of credits.

6. The configuration method as claimed in claim 1, wherein configuring the control entity comprises adding filtering rules that authorize or not authorize attachment of terminals to the second network.

7. The configuration method as claimed in claim 1, configuring the control entity comprises configuring at least one criterion used to authorize or not authorize the attachment of the terminal.

8. The configuration method as claimed in claim 1, wherein the at least one configuration parameter comprises a transaction identifier.

9. The configuration method as claimed in claim 1, wherein the at least one configuration parameter comprises a security key of the operator managing the first network.

10. The configuration method as claimed in claim 1, wherein the at least one configuration parameter comprises a validity duration for attaching to the second network.

11. A configuration device implemented in a control entity of a second network and comprising:
a processor; and
a non-transitory computer-readable medium comprising instructions stored thereon, which when executed by the processor configure the configuration device to configure dynamically a set of at least one terminal of at least one client user of an operator managing a first communications network, prior to attachment of the at least one terminal to the second communications network whose transmission resources are temporarily used to route data from the at least one terminal to a remote server, the configuring comprising the following acts each performed by the configuration device before the at least one terminal requests attachment to the second network:

receiving, from a control entity of the first network, a management instruction enabling the attachment of the at least one terminal to the second network for a geographical area, wherein the management instruction comprises at least one identifier of each of the at least one terminal in the set and an item of information that limits attachment duration of the at least one terminal to the second network, configuring the control entity to authorize the attachment of the at least one terminal to the second network on the basis of the received management instruction and the item of information that limits attachment duration of the at least one terminal to the second network, and dynamically configuring the at least one terminal by sending, only to the at least one terminal of the set for which the identifier was received, at least one configuration parameter that enables the at least one terminal to attach to the second network for the limited attachment duration, the at least one terminal lacking pre-configuration data for attaching to the second network prior to the sending.

12. A terminal of a client user of an operator managing a first communications network, able to attach to a second communications network whose transmission resources are temporarily used to route data from the terminal to a remote server, the terminal comprising:
   a receiver;
   a processor; and
   a non-transitory computer-readable medium comprising instructions stored thereon, which when executed by the processor dynamically configure the terminal to:
      send a request to the second network to attach to the second network; and
      prior to sending the request to attach to the second network:
         receiving from a control entity of the second network, through the receiver, at least one configuration parameter that enables the terminal to attach to the second network for a limited duration authorized by the control entity of the second network, the at least one configuration parameter having been sent by the control entity of the second network in response to a management instruction received by the control entity from the first network identifying the terminal, the management instruction comprising an item of information that limits the attachment duration of the terminal to the second network and, the terminal lacking pre-configuration data for attaching to the second network prior to receiving the at least one configuration parameter,
         receiving, through the receiver, an attachment control message comprising conditions of attachment to the second network,
         configuring the terminal to enable the terminal to effectively request attachment to the second network based on the at least one configuration parameter, the configuring comprising updating a list of networks that the terminal is able to access to include the second network, a geographical area associated with the second network and a duration for which the terminal is able to attach to the second network.

13. The terminal as claimed in claim 12, wherein the item of information that limits the attachment duration of the terminal to the second network comprises a number of user credits.

14. A non-transitory computer-readable recording medium on which a program is recorded comprising instructions which when executed by a processor of a control entity of a second network, configure the control entity of a second network to:
   dynamically configure a set of at least one terminal of at least one client user of an operator managing a first communications network, prior to the attachment of the at least one terminal to a second communications network whose transmission resources are used to route data from the at least one terminal to a remote server,
   the configuring comprising the following acts each performed by the control entity before the at least one terminal requests attachment to the second network:
   receiving, from a control entity of the first network, a management instruction enabling the attachment of the at least one terminal to the second network for a geographical area, wherein the management instruction comprises at least one identifier of each of the at least one terminal in the set and an item of information that limits attachment duration of the at least one terminal to the second network,
   configuring the control entity to authorize the attachment of the at least one terminal to the second network on the basis of the received management instruction and the item of information that limits attachment duration of the at least one terminal to the second network, and
   dynamically configuring the at least one terminal by sending, only to the at least one terminal of the set for which the identifier was received, at least one configuration parameter that enables the at least one terminal to attach to the second network for the limited attachment duration, the at least one terminal lacking pre-configuration data for attaching to the second network prior to the sending.

* * * * *